(12) United States Patent
Zhang

(10) Patent No.: US 8,622,734 B2
(45) Date of Patent: Jan. 7, 2014

(54) SYSTEM AND METHOD FOR FORMING A SHOE SOLE

(75) Inventor: Jian Zhang, Zhongshan (CN)

(73) Assignee: Chaussures Regence Inc., Quebec (CA)

( * ) Notice: Subject to any disclaimer, the term of this patent is extended or adjusted under 35 U.S.C. 154(b) by 0 days.

(21) Appl. No.: 13/176,803

(22) Filed: Jul. 6, 2011

(65) Prior Publication Data

US 2012/0139156 A1    Jun. 7, 2012

(51) Int. Cl.
*B29C 45/12*  (2006.01)
*B29C 45/14*  (2006.01)
*B29C 45/27*  (2006.01)

(52) U.S. Cl.
USPC ......................................................... 425/588

(58) Field of Classification Search
USPC ......................................................... 425/588
See application file for complete search history.

(56) References Cited

U.S. PATENT DOCUMENTS

| | | | | |
|---|---|---|---|---|
| 3,915,608 A | * | 10/1975 | Hujik | 425/119 |
| 2006/0225305 A1 | * | 10/2006 | Morgan et al. | 36/59 R |

FOREIGN PATENT DOCUMENTS

| | | |
|---|---|---|
| EP | 1106094 A1 | 6/2001 |
| EP | 1612035 A1 | 1/2006 |
| FR | 2107813 A2 | 5/1972 |
| GB | 2039716 A | 8/1980 |
| WO | 9956576 A1 | 11/1999 |
| WO | 2010012401 A1 | 2/2010 |

* cited by examiner

*Primary Examiner* — Ryan Ochylski

(74) *Attorney, Agent, or Firm* — Ziolkowski Patent Solutions Group, SC

(57) ABSTRACT

A system and method for forming a shoe sole (10) is disclosed. Specifically, there is provided a sole mould for fabricating high-quality shoe soles with great efficiency and a method of using such a mould, wherein the soles feature good air permeability and perfect match with the feet by automatically adapting themselves to the shape of the feet. The sole mould includes a first mould (26) for injection-moulding the underside of a leather layer, and a second mould (28) for injection-moulding the upper surface of the leather layer to form the sole. Further, the first mould is configured in the same shape as the fore sole of the foot and the second mould is configured in the shape of a complete sole.

7 Claims, 14 Drawing Sheets

SYSTEM AND METHOD FOR FORMING A SHOE SOLE

CROSS-REFERENCE TO RELATED APPLICATIONS

This application claims benefit of Chinese application Serial No. 201010218488.7, filed on Jul. 6, 2010. All documents above are incorporated herein in their entirety by reference.

TECHNICAL FIELD

The present invention relates to a technology for making shoes, and particularly relates to a mould for making shoe soles and its usage.

BACKGROUND OF THE INVENTION

Ordinary shoe soles are generally formed up by one or two types of materials, which have poor air permeability and tend to fatigue the feet after long-term wear. Besides, they fit badly with the feet and may easily cause the fore part of the foot to deform if worn for a long time.

The present invention discloses a technology which overcomes the above-mentioned shortcomings by providing a sole which can fit snugly with the foot, has good air permeability and elegant appearance. It can automatically adapt to the shape of the foot, and is therefore suitable for long-term wear.

SUMMARY OF INVENTION

According to a preferred embodiment of the present invention, there is provided a system and method for forming a shoe sole comprising a fore sole and a rear sole. The system comprises a first mould for injection-moulding an underside of a midsole, such as a leather layer, to form an injection-moulded outsole wherein the first mould is configured in the shape of the fore sole. The system also comprises a second mould for injection-moulding an upper surface of the midsole to form an injection-moulded sole wherein the second mould is configured in the shape of a complete sole. The midsole is processed by the first mould and the second mould to fabricate the shoe sole having the injection-moulded insole and the injection-moulded outsole.

Preferably, the sole mould is used to fabricate high-quality soles with great efficiency, wherein the sole features good air permeability and is suitable for long-term wear because it can fit snugly with the foot by adapting itself automatically to the shape of the foot.

Further, the first mould may include a first female mould and a first male mould fitting into each other, both of which are in the shape of the fore part of the foot. The first female mould further includes a first downward concave which corresponds to a raised area (to be injection-moulded) on the underside of the leather layer; and the first male mould has a cylindrical bore and a first injection hole in the first injection area which corresponds to the first downward concave of the first female mould. Therefore, a raised injection area can be made on the underside of the leather layer by injection moulding after the first female mould and the first male mould is assembled.

The second mould may further include a second female mould and a second male mould, both configured in the same shape as a complete foot sole and can fit into each other. Further, the aforementioned first female mould and the first male mould, both resembling the fore part of the sole, also match the fore part of the sole-shaped second female mould and the second male mould. The said second female mould further includes a second downward concave in the same shape as and at the corresponding position of the first downward concave of the first female mould. The said second male mould further features a second injection area in the same shape as and at the corresponding position of the second downward concave. Still further, a second injection hole (which passes through the leather layer) is designed on the said second injection area. The second male mould further features an upward-concaved third injection area in the rear part of the sole, as well as a second injection hole (which passes through the leather layer) in the said third injection area. The leather layer, having been processed by the first female mould and the first male mould, is further processed by the second female mould and the second male mould, generating an injection-moulded shoe sole with an embedded leather layer. Meanwhile, a raised injection area is formed on the upper side of the said leather layer.

A middle plate may be inserted between the second female mould and the second male mould when the two are assembled to process the leather layer through injection moulding, so as to produce a cambered or arcuate shoe sole.

Preferably, the first injection hole passes through the first male mould through an injection channel; the second injection hole passes through the second male mould through an injection channel.

According to the present invention, there is also provided a method of forming a shoe sole comprising a fore sole and a rear sole. Preferably, the method comprises a step A of assembling a fore sole-shaped first mould onto an injection machine and placing a midsole in said first mould for injection moulding to form a first raised injection area on an underside of said midsole to form an injected-moulded outsole. The method also comprises a step of taking said midsole out of said first mould and placing it into a shoe sole-shaped second mould for injection moulding to form the shoe sole comprising a second raised injection area on an upper surface of said midsole to form an injected-moulded insole.

Step A may include assembling the fore sole-shaped first mould onto the injection machine. After that, placing the leather layer into the first mould for injection moulding to form a raised injection area on the underside of the leather layer.

Step B may include taking the leather layer out of the first mould and put it into the sole-shaped second mould for injection moulding to produce a shoe sole with imbedded leather layer. Meanwhile, an injection area which protrudes outwardly is formed on the top surface of the leather layer of the said shoe sole.

Step A may include:

Step A1: Assemble the fore sole-shaped first female mould onto an injection machine. Place the leather layer on top of the first female mould with the underside facing downwards, aligning the pre-designed cylindrical bore and the leather injection hole on the leather layer with the first downward concave of the first female mould;

Step A2: Assemble and fix the fore sole-shaped first male mould and the first female mould, making sure that the cylindrical bore and the first injection hole located on the first male mould are aligned with the cylindrical bore and the leather injection hole on the leather layer respectively;

Step A3: Infuse the soft plastic into the first male mould through the first injection hole of the first male mould by using an injection machine. The soft plastic, after going through the first injection hole on the first male mould and the leather injection hole on the leather layer, is channelled into the first downward concave of the first female mould and shaped up, resulting in an outward-protruding injection area on the underside of the leather layer. Further, the soft plastic inside the first downward concave moves through the cylindrical bore of the leather layer to form a pyramidal protuberance, which is integrated with the leather layer. After that, split the first male mould and the first female mould to take out the leather layer bearing an injection area in the underside.

Step B may include:

Step B1: Place the sole-shaped second female mould of the second mould on a platform, making sure that the underside of the leather layer shall face downward on top of the second female mould, and that the injection area on the underside of the leather layer shall match with the second downward concave of the second female mould;

Step B2: Assemble and fix the sole-shaped second male mould and the second female mould of the second mould, making sure that the second injection area of the second male mould is aligned with the second downward concave, and that the pyramidal protuberance on the leather layer shall be suspended inside the second injection area;

Step B3: Infuse a second formula soft plastic into the second male mould through the second injection hole of the second male mould by using an injection machine. The second soft plastic is moulded into a shoe sole with imbedded leather layer inside the second injection area and the third injection area. During this process, a raised injection area is generated on the upper surface of the leather layer.

Step B1 may include:

Place the sole-shaped second female mould of the second mould on a platform, and position the middle plate on top of the second female mould. Then place the leather layer on the said middle plate with its underside facing down. Make sure that the injection area on the underside of the leather layer matches with second downward concave of the second female mould. Then infuse second formula plastic into an upwardly-concaved third injection area for forming a rear part of the shoe sole The final purpose is to produce arcuation on the leather layer.

The soft plastic used may be thermoplastic polyurethane (TPU). Preferably, the first formula plastic is softer than said second formula plastic.

Preferably, the cylindrical bores and the injection holes have a diameter of about 2 mm-10 mm.

The sole mould described in this Invention is simple in structure and easy to operate. It is capable of manufacturing quality foot soles of good air permeability with high efficiency. Moreover, these shoe soles can perfectly match the feet by automatically adapting themselves to the shape of the feet, and are therefore suitable for wear for a long time. Moreover, the product yield is relatively high.

DETAILED DESCRIPTION OF THE PREFERRED EMBODIMENTS

The preferred embodiments of this Invention will now be described by referring to the attached drawings.

Figure 1:
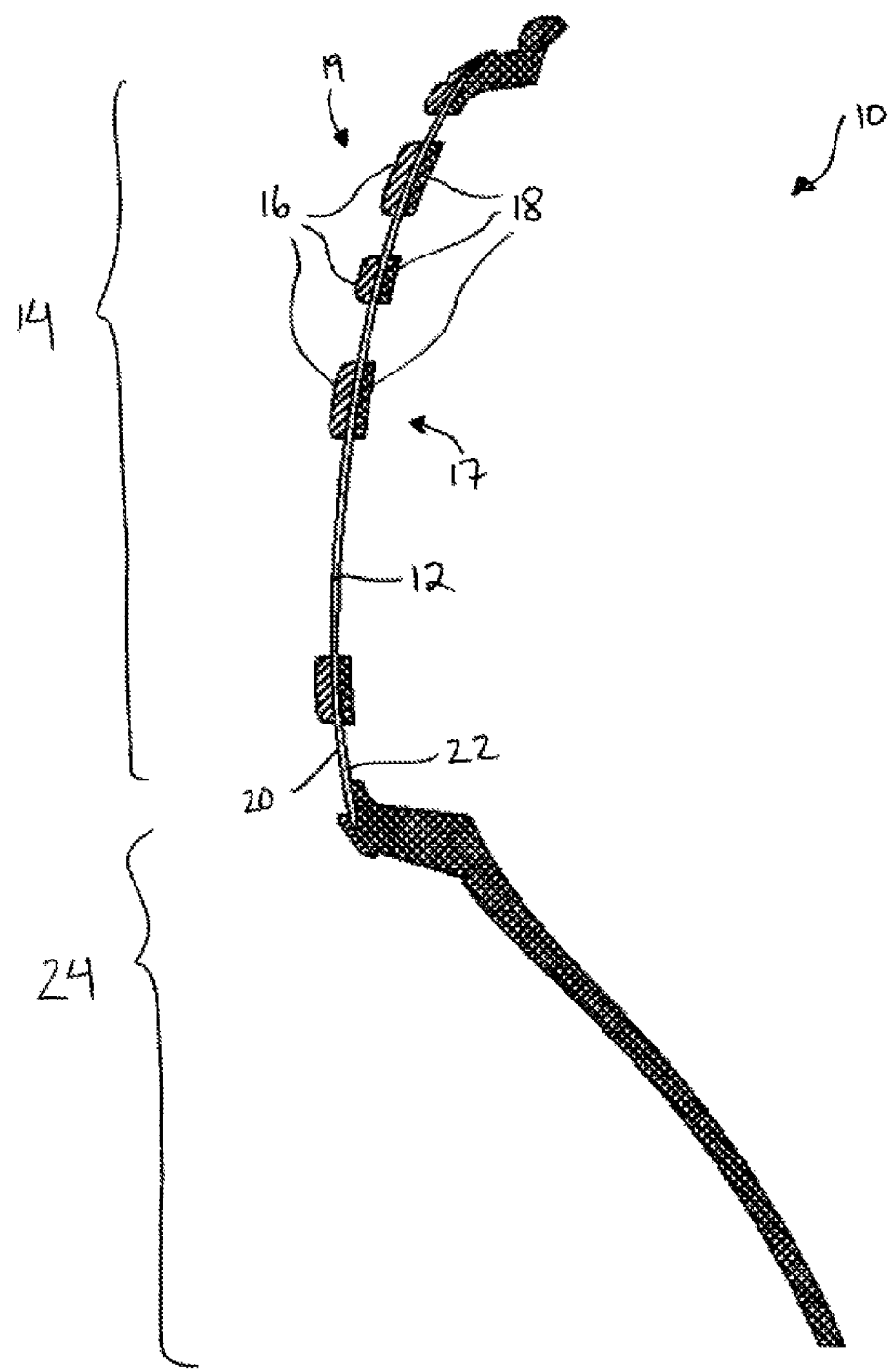
FIG. 1 is a side sectional view of a shoe sole formed by the sole mould and method, according to a preferred embodiment of the present invention.
Figure 2:
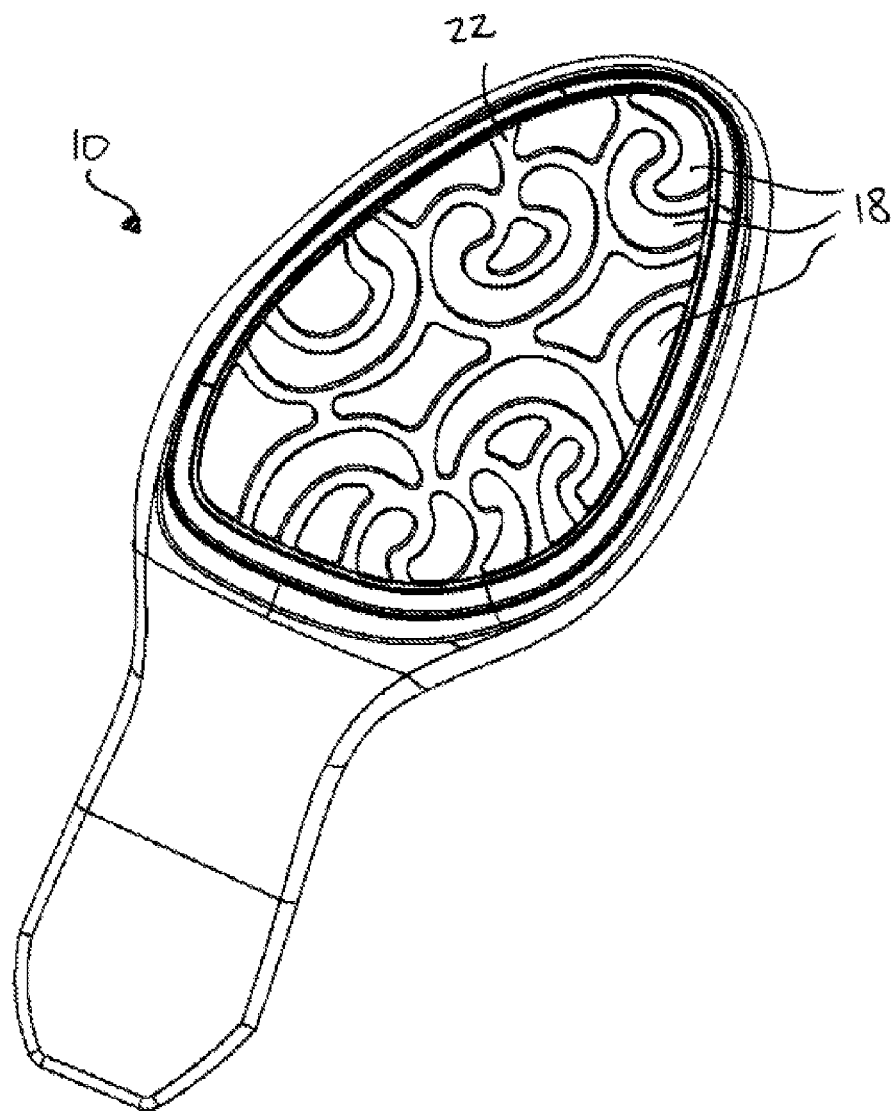
FIG. 2 is a top view of the shoe sole of FIG. 1.

Now referring to FIG. 1 and FIG. 2, there illustrated a shoe sole 10 fabricated according to the system and method of the present invention. The shoe sole has good air permeability and is suitable for long-time wear, as mentioned in the Background. This shoe sole 10 fits snugly with the foot (not shown) by automatically adapting itself to the shape of the foot. The main body or midsole 12 of the fore sole 14 is illustratively a leather layer which is primarily made of leather materials. By way of injection-moulding soft plastics, one or more first raised sole lines 16 and one or more second raised sole lines 18 are formed respectively on an underside 20 of the midsole 12 to thus form an outsole 17 and an upper surface 22 of the midsole 12 of the said leather layer 12 to thus form an insole 19. A rear part 24 of the sole 10 is also obtained by injection-moulding the same plastics and is integrated with the leather layer 12 to constitute a complete shoe sole 10. The raised sole lines 16, 18 are shaped like ribs that define channels in between these ribs, which ensure good air circulation.

Figure 3:
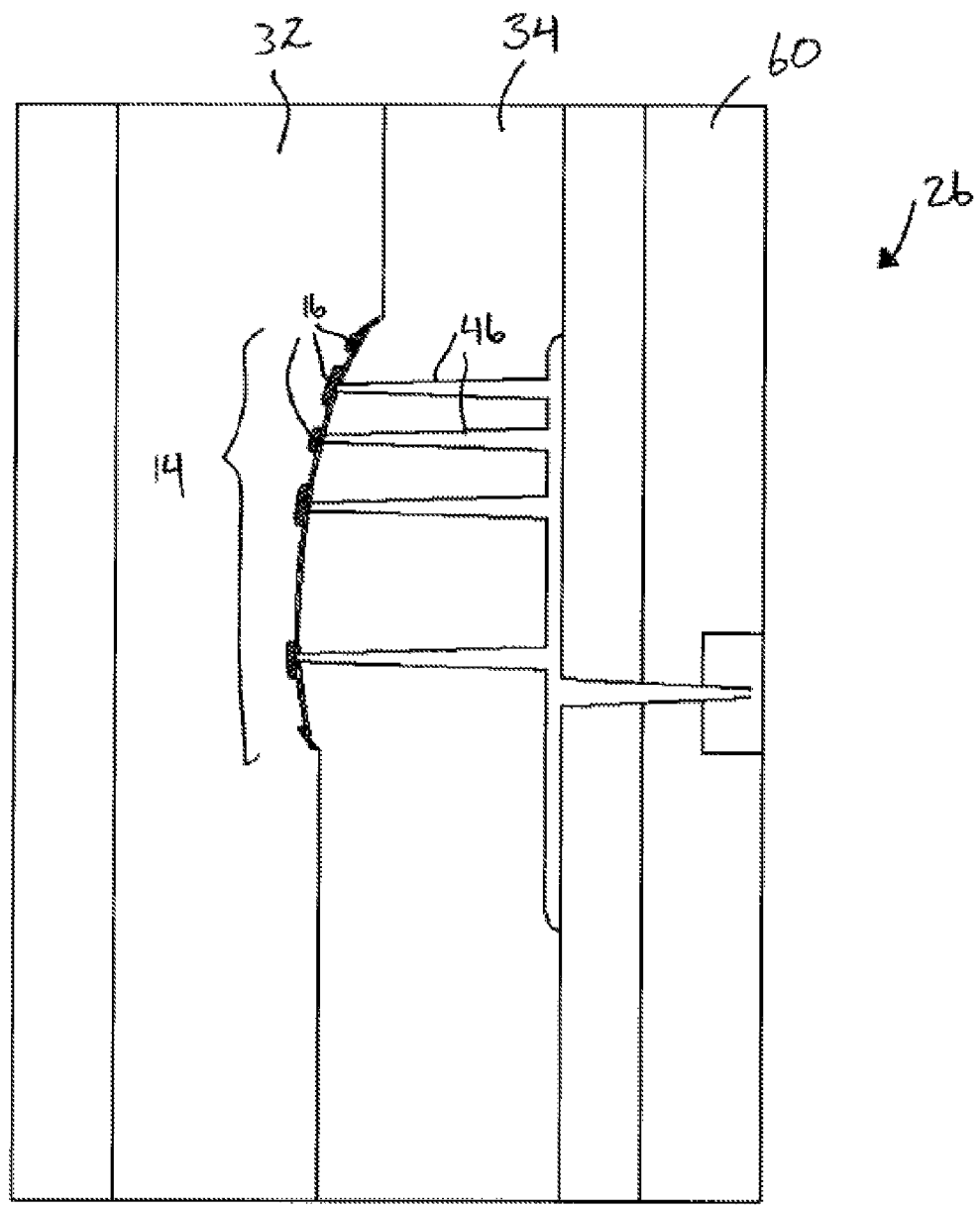
FIG. 3 is a sectional view of a first female mould and a first male mould in an assembled position, according to a preferred embodiment of the present invention.
Figure 4:
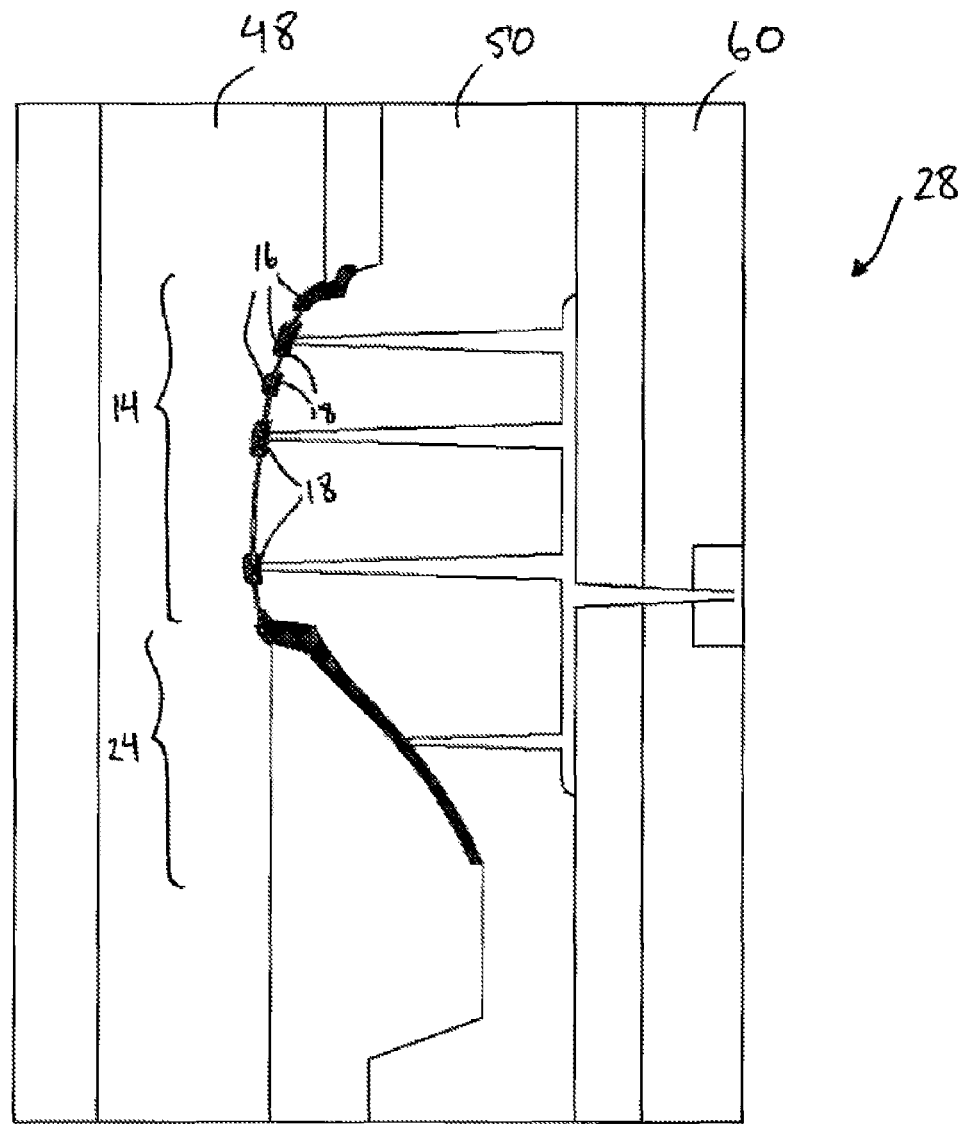
FIG. 4 is a sectional view of a second female mould and a second male mould in an assembled position, according to a preferred embodiment of the present invention.
Figure 5:
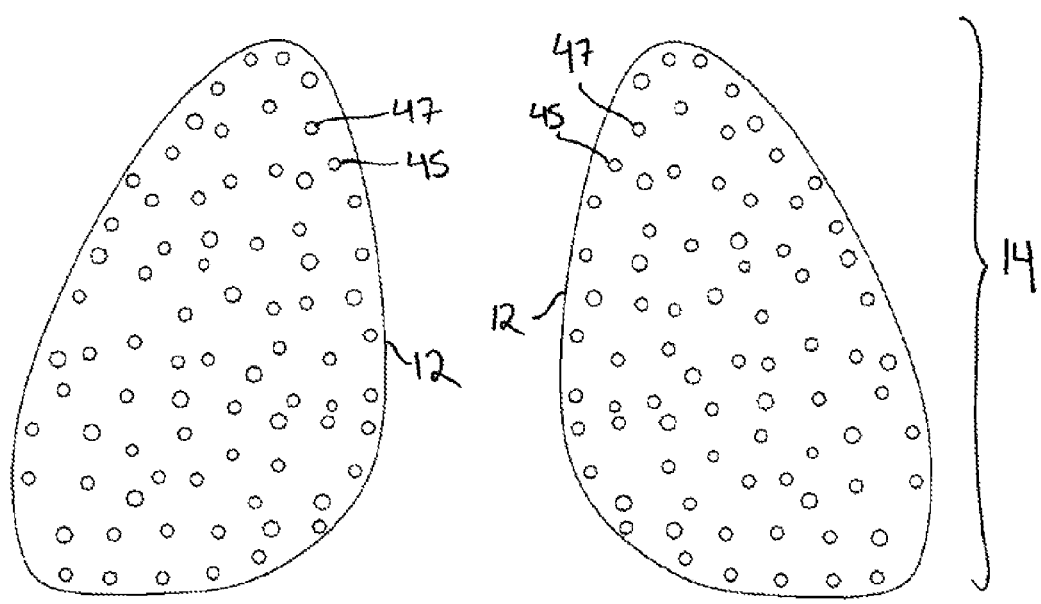
FIG. 5 is a top view of two leather layers used by a sole mould for making shoe soles, according to a preferred embodiment of the present invention.

Now referring to FIG. 3, FIG. 4 and FIG. 5, in addition to FIG. 1, there is illustrated a sole mould according to an illustrative embodiment of the present invention. The sole mould includes two parts: a first mould 26 which resembles a fore sole 14 and a second mould 28 which has the shape of a complete foot sole. The first mould 26 and the second mould 28 are used successively to produce the shoe sole 10. Firstly, the first mould 26 is used to treat the leather layer 12, in particular the fore part 14 of the shoe sole 10, by injection moulding, which forms the one or more first raised sole lines 16 on the underside 20 of the leather layer 12. Secondly, the second mould 28 is used to treat the leather layer 12 bearing the first raised sole lines 16, resulting in one or more second raised sole lines 18 on the upper surface 22 of the leather layer 12. Meanwhile, the rear part 24 of the shoe sole 10 is obtained by injection-moulding soft plastics in the second mould 28 such that the rear part 24 is integrated with the leather layer 12. A finished sole 10 comprising one or more second raised sole lines 18 of the fore sole 14 on the upper surface 22 of the midsole 12 to form the insole 17 and the one or more first raised sole lines 16 of the fore sole 14 on the underside 20 of the shoe sole 10 to form the outsole 19 is produced by the moulds, 26 and 28.

Figure 6:
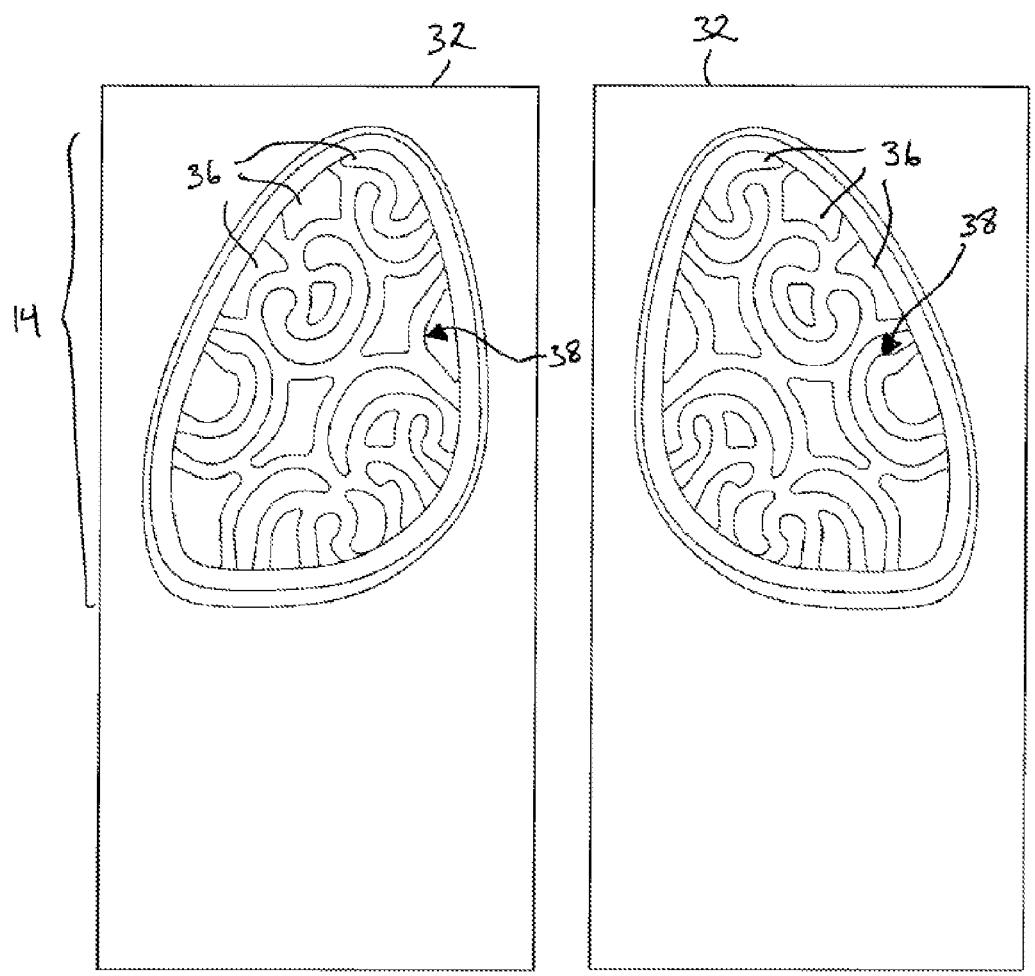
FIG. 6 is a top view of a left and right first female moulds, according to a preferred embodiment of the present invention.

Now referring to FIG. 6, in addition to FIG. 1, FIG. 3, FIG. 4 and FIG. 5, the first mould 26 further includes a first female mould 32 and a first male mould 34, both of which are available as a pair to produce a pair of shoe soles 10. The first female mould 32 and the first male mould 34 are configured in the same shape as the fore sole 14 of the foot and fit into each other when assembled as illustrated. The first female mould 32 further contains one or more first downward concave cavities as in 36 which when injected moulded, or infused with plastic, form a first raised area 38 on the underside 20 of the leather layer 12.

Figure 7:
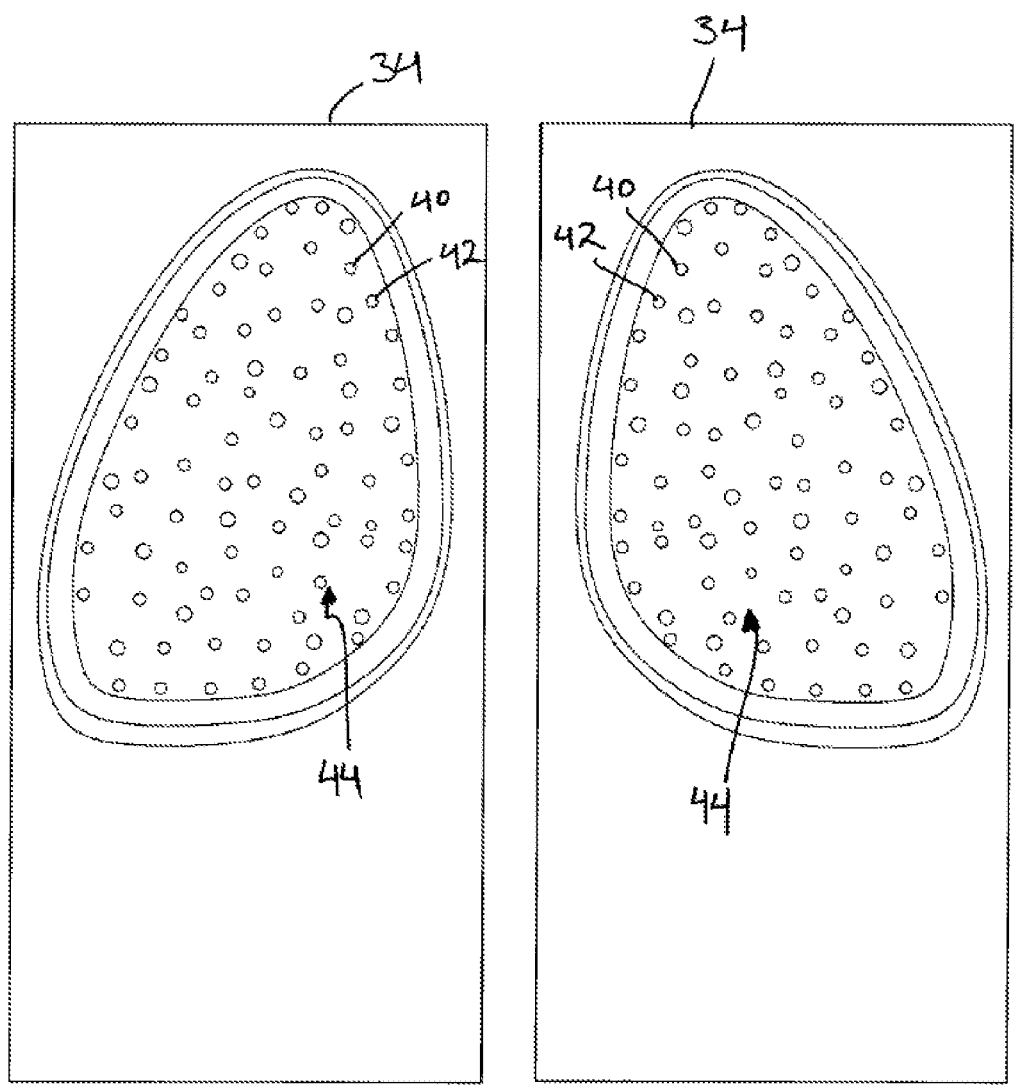
FIG. 7 is a bottom view of a left and right first male moulds, according to a preferred embodiment of the present invention.
Figure 8:
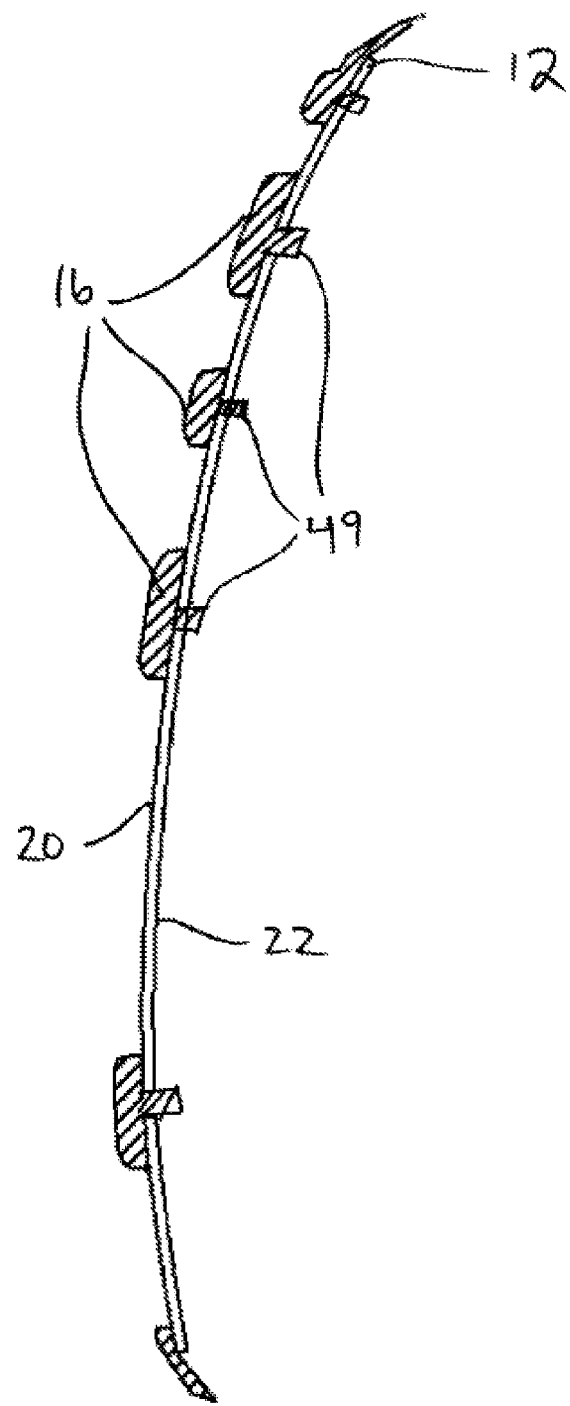
FIG. 8 is a sectional view of the leather layer of FIG. 5 after being injection moulded using a first female mould and a first male mould, according to a preferred embodiment of the present invention.

Now referring to FIG. 7 and FIG. 8, in addition to FIG. 3, the first male mould 34 includes one or more cylindrical bores 40 and one or more first injection holes 42 in a first injection area 44 each one of which are in fluid communication with one of the one or more first downward concave cavities 36 via each of one or more second injection hole 45 and each of one or more second cylindrical bore 47 respectively provided for in the layer 12. The one or more second cylindrical bores 47 and the one or more second injection hole 45 provide fluid communication for the plastic between the one or more first downward concave cavities 36 and the one or more first cylindrical bores 40 and the one or more first injection holes 42 through the layer 12 when respectively aligned therewith. Illustratively, through the one or more first injection hole 42, each of which are in fluid communication with an injection channel 46, soft plastic is supplied from the injection channels 46 to be infused into the one or more first downward concave cavities 36 via the one or more second injection holes 45. Once plastic is infused into the one or more first downward concave cavities as in 36, plastic is allowed to pass through the layer 12 via the one or more second cylindrical bores as in 47 and into the one or more of first cylindrical bore 40 provided for in the first male mould 34 such that one or more plastic protuberances as in 49 are embedded within the midsole 12 and extend from the upper surface. The first female mould 32 and the first male mould 34 are then assembled to mould the plastic, leaving the one or more first raised sole lines 16 on the under side 20 of the leather layer 12.

Figure 9:
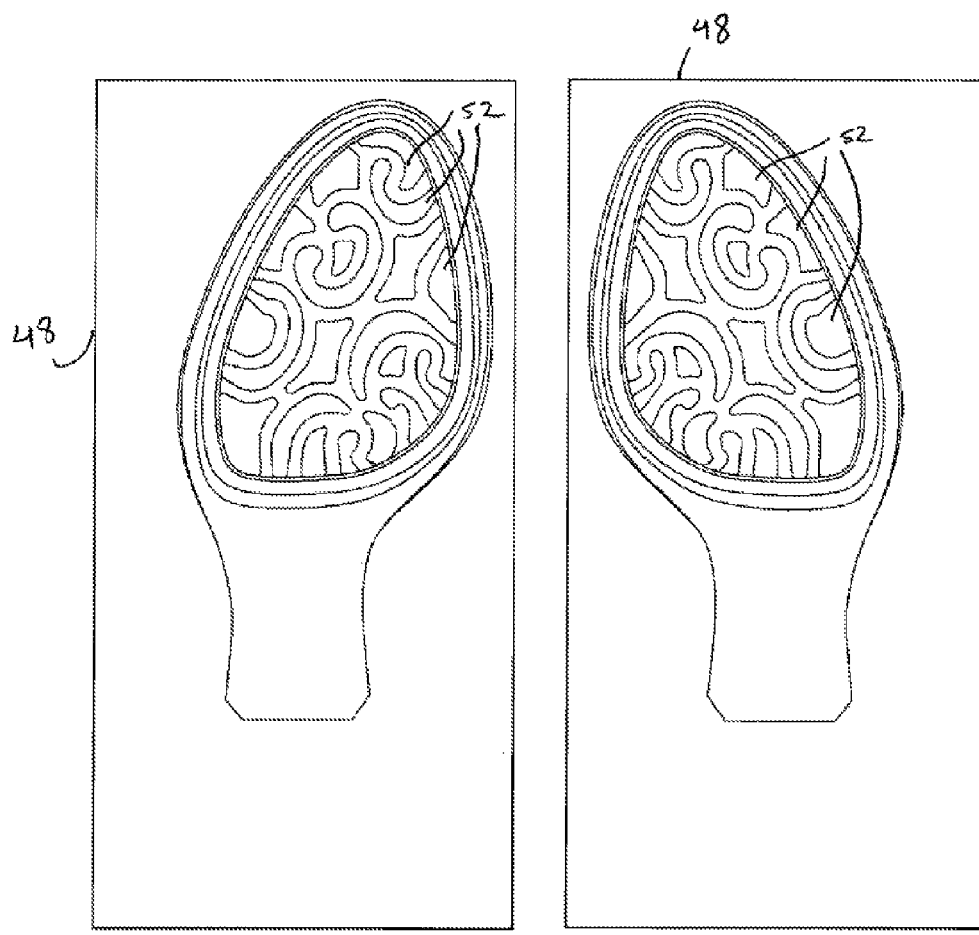
FIG. 9 is a top view of a left and right second female moulds, according to a preferred embodiment of the present invention.
Figure 10:
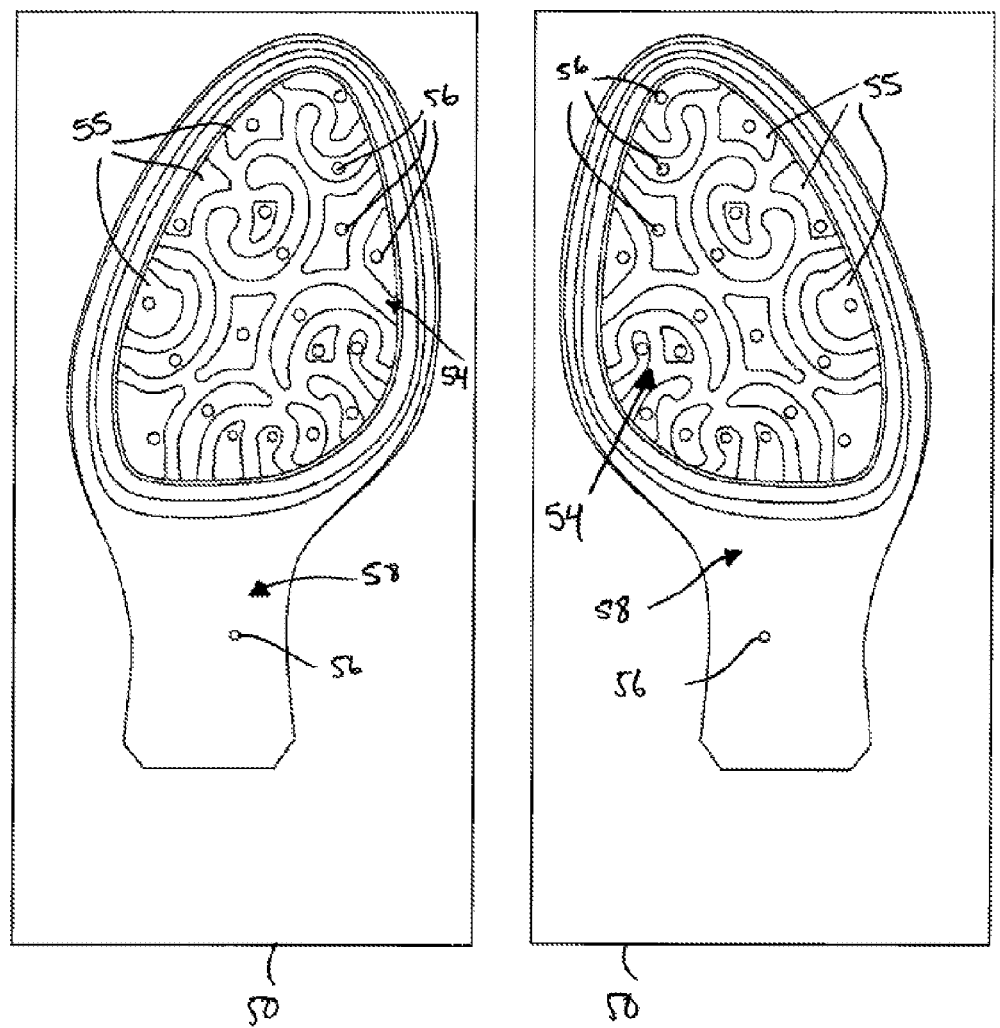
FIG. 10 is a bottom view of a left and right second male moulds, according to a preferred embodiment of the present invention.
Figure 11:
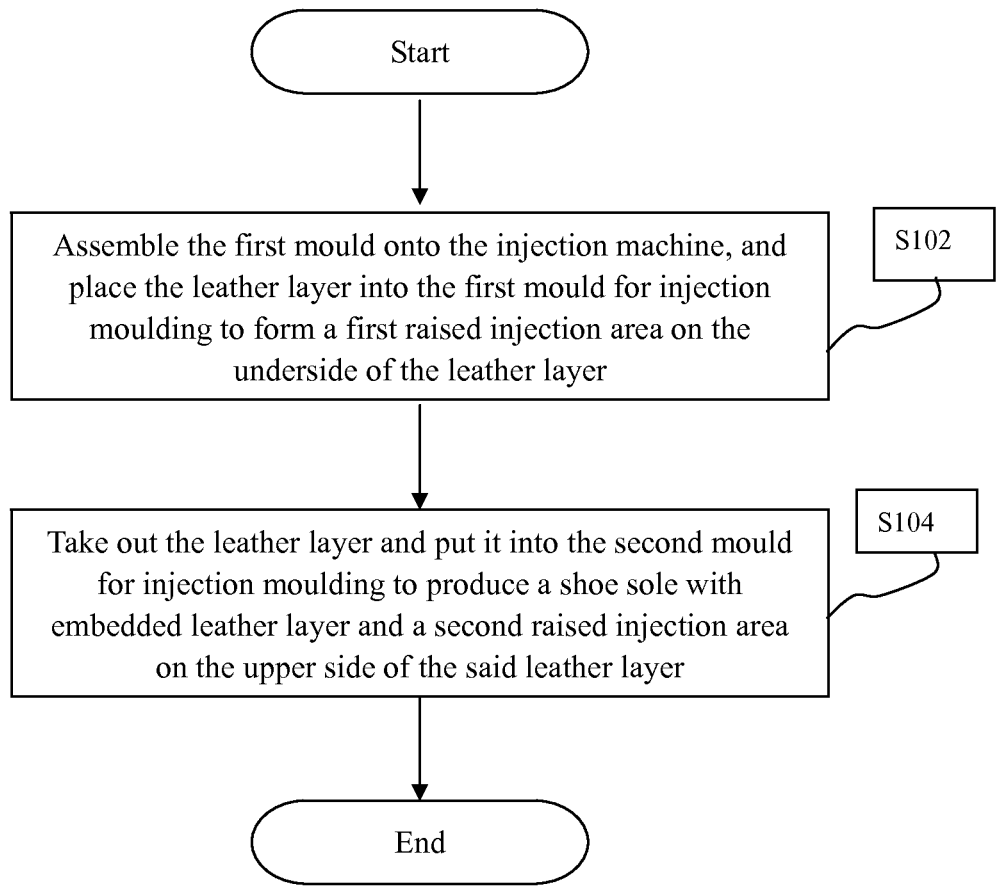
FIG. 11 is a flow process of one example of a method for using the sole mould, according to a preferred embodiment of the present invention.

Now referring to FIG. 9 and FIG. 10, the second mould 28 further includes a second female mould 48 and a second male mould 50, both of which are available in pair to produce a pair of shoe soles 10. The said second female mould 48 and second male mould 50 are configured in the same shape as a complete foot sole 10 and can fit into each other. Furthermore, the aforementioned first female mould 32 and the first male mould 34 also match the fore part 14 of the sole-shaped second female mould 48 and the second male mould 50. The second female mould 48 further includes one or more second downward concave cavities as in 52 in the same shape as and at the corresponding position of the one or more first downward concave cavities as in 36. The second male mould 50 further features a second injection area 54 comprising one or more second upward concave cavities as in 55 in the same shape as and at the corresponding position of the one or more second downward concave cavities as in 52. Still further, one or more second injection holes 56 are provided in the second injection area 54 for each of the one or more second upward concave cavities as in 55.

Still referring to FIG. 10, the second male mould 50 further features an upward-concaved third injection area 58 to form the rear part 24 of the sole 10 when it is injected moulded, as well as a second injection hole 56 for injecting plastic into the third injection area 58. The leather layer 12, having been processed using the first female mould 32 and the first male mould 34, is further processed using the second female mould 48 and the second male mould 50, generating an injection-moulded shoe sole 10 with an embedded leather layer 12 by infusing soft plastic into the second injection area 54 and the third injection area 58 through the second injection hole 56 and the injection channels 46. As a result, the one or more second raised sole lines 18 are formed on the upper surface 22 of the leather layer 12.

It should be noted that the soft plastic being used for injection purposes for the sole mould described herein is illustratively thermoplastic polyurethane (TPU). Illustratively, the plastic used to form the one or more first raised sole lines 16 may be harder than the plastic used to form the one or more second raised sole lines 18.

Now referring back to FIG. 1 and FIG. 4, the sole mould provided in the present Invention further includes a middle plate 60, which is inserted between the second female mould 48 and the second male mould 50 when the two are assembled for injection moulding the leather layer 12. The ultimate purpose is to produce a curved shoe sole, for instance the curved rear part of high-heeled leather shoes for women.

The sole mould described in this Invention is simple in structure and easy to operate. It is capable of manufacturing quality foot soles of good air permeability with high efficiency. Moreover, these shoe soles 10 can perfectly match the feet by automatically adapting themselves to the shape of the feet, and are therefore suitable for wear over a long period of time. Moreover, the product yield is relatively high.

Figure 12:
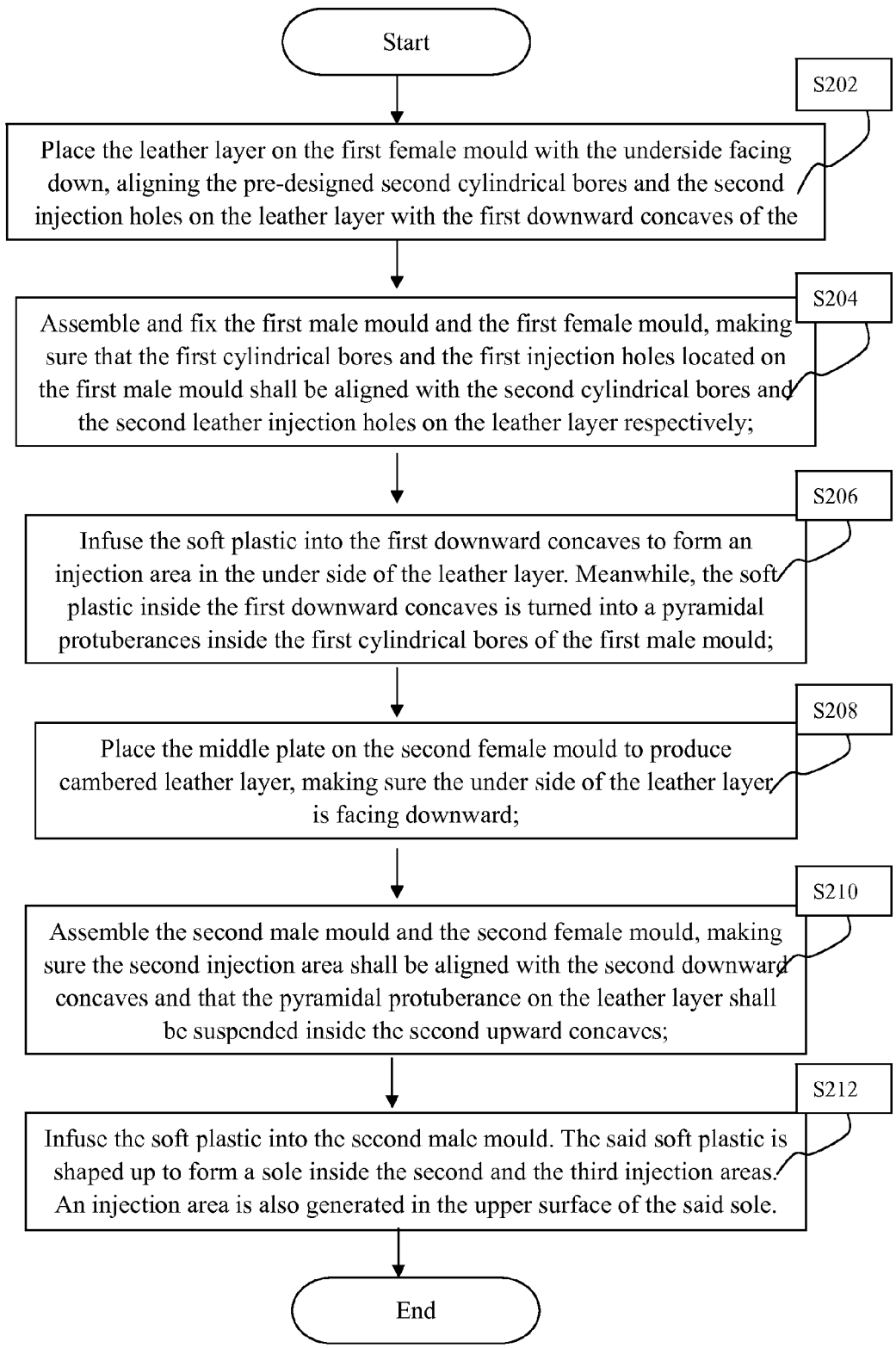
FIG. 12 is a flow process of another example of a method for using the sole mould, according to a preferred embodiment of the present invention.

Now referring to FIG. 12, there is provided an illustrative example of the method of using the sole mould which comprises the following steps.

Step S102: Assemble the fore sole-shaped first mould 26 onto an injection machine (not shown). After that, place the leather layer 12 into the first mould 26 for injection moulding to form the first raised area 38 on the underside 20 of the leather layer 12 comprising one or more first raised sole lines 16.

Step S104: Take the leather layer 12 out of the first mould 26 and put it into the foot sole-shaped second mould 28 for injection moulding to produce a shoe sole 10 with an embedded leather layer 12 comprising the second raised injection area 54 on the upper surface 22 of the leather layer 12 comprising the one or more second raised sole lines 18.

Now referring to FIG. 12, there is provided another illustrative example of the method of using the sole mould is composed of the following steps:

Step S202: Assemble the fore sole-shaped first female mould 32 of the first mould 26 onto the injection machine. Place the leather layer 12 on top of the first female mould 32 with the underside 20 facing downwards and align the each pre-designed one or more second cylindrical bores 47 and one or more second injection holes 45 on the leather layer 12 with the each of the one or more first downward concave cavities 36 of the first female mould 32.

Step S204: Assemble and fix the fore sole-shaped first male mould 34 and the first female mould 32, making sure that each of the first cylindrical bores 40 and each of the first injection holes 42 located on the first male mould 34 are aligned with each of second cylindrical bores 47 and each of the second injection holes 45 on the leather layer 12 respectively. Then, place a puller plate 64 on top of the first male mould 34.

Step S206: By way of the one or more first injection hole 42 and the one or more injection channels 46, infuse the soft plastic into the first male mould 34 by using an injection machine (not shown). The soft plastic, after going through the one or more first injection holes 42 on the first male mould 34 is channelled into the one or more first downward concave cavities 36 of the first female mould 32 and shaped up, resulting in the first raised area 38 on the underside 20 of the leather layer 12 to form the first one or more first raised sole lines 16. Further, the soft plastic inside the one or more first downward concave cavities 36 moves through the one or more second cylindrical bores 47 of the leather layer 12 and into the one or more first cylindrical bores 40 to form one or more pyramidal protuberances 49, which are integrated with the leather layer 12. After that, the first male mould 34 and the first female mould 32 are split to remove the leather layer 12 bearing a first injection area 44 on the underside 20.

Referring back to FIG. 5, it is preferable to pre-punch the midsole 12 to form holes matching with the cylindrical bores 47 and the injection holes 45 prior to placing the midsole 12 on top of the first female mould 32. Alternatively, the cylindrical bores 47 and the injection holes 45 may be punched in the midsole 12 once the midsole is in the first female mould 32.

Step S208: Assemble the foot sole-shaped second female mould 48 of the second mould 28 onto the injection machine and place the middle plate 60 on the said second female mould 48. Lay up the leather layer 12 onto the middle plate 60, making sure that the underside 20 of the leather layer 10 faces downward and that the first injection area 44 on the underside 20 of the leather layer 10 shall match with the second downward concave cavities 52 of the second female mould 48. The final purpose is to produce arcuation on the leather layer 12;

Step S210: Assemble and fix the foot sole-shaped second male mould 50 and the second female mould 48 of the second mould 28, making sure that the second injection area 54 of the second mould is aligned with the one or more second downward concave cavities 52. When aligned, the one or more pyramidal protuberances 49 on the leather layer 12 are suspended, or project, inside the second injection area 54. Then, place the puller plate 64 on top of the second male mould 50.

Step S212: By way of the one or more second injection holes 56 on the second male mould 50 and the one or more injection channels 46, infuse the soft plastic into the second male mould 50 by using an injection machine. The soft plastic is moulded into a shoe sole 10 to combine with embedded leather layer 12 and the one or more pyramidal protuberances 49 inside the second injection area 54 and the third injection area 58. During this process, the one or more pyramidal protuberances 49 as mentioned in Steps S206 and S210 are embedded into the plastic injected into the one or more second upward concave cavities 52, therefore leaving a second raised injection area 54 of second raised sole lines 18 on the upper surface 22 of the leather layer 12.

Figure 13:
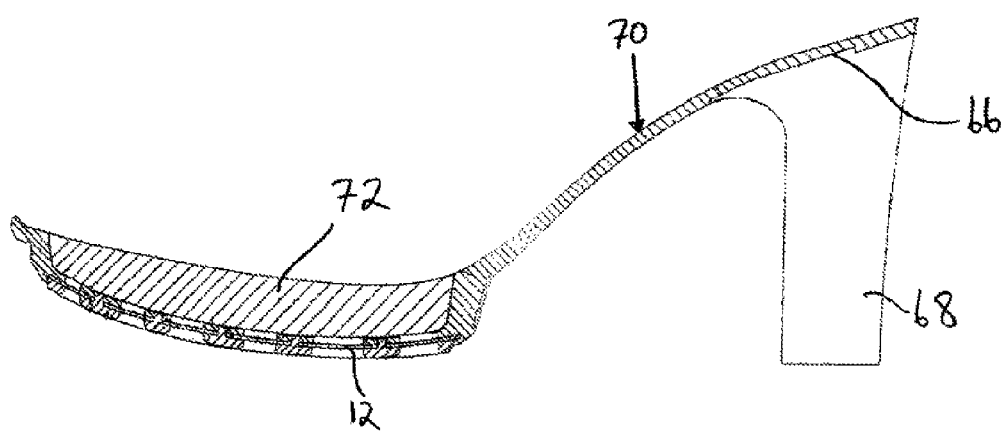
FIG. 13 is a sectional view of an illustrative shoe sole after being injection moulded using a second female mould and a second male mould, according to a preferred embodiment of the present invention.

Now referring to FIG. 13, there is further provided a connection grove 66 in the sole 10 to affix a heel 68 thereto. There may also be provided a piece of decorative leather (not shown) on the arch 70 of the sole 10. Furthermore, a polyurethane (PU) filler 72 may be provided in the upper surface 22.

Figure 14:
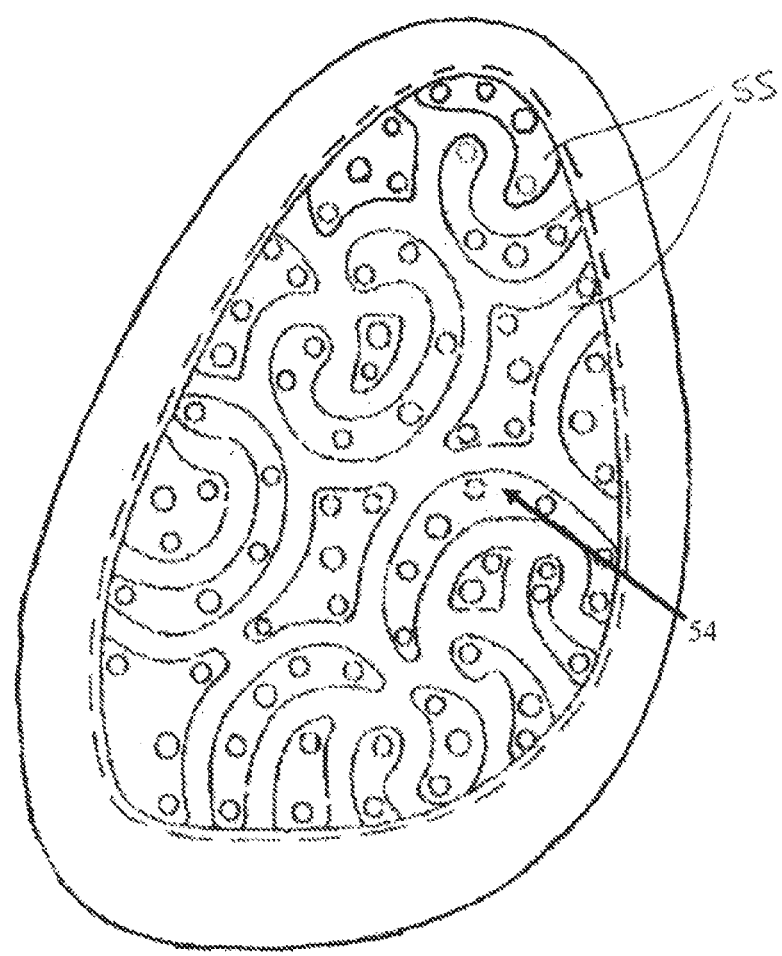
FIG. 14 is a bottom view of a second male mould, according with another illustrative embodiment of the present invention.

Now referring to FIG. 14, in addition to FIG. 6, in accordance with another illustrative embodiment of the present invention, the one or more first downward concave cavities 36 are provided in communication to form the first raised area 38 in the shape of one or more first curved connection lines (not shown), and the one or more second upward concave cavities 55 are in communication to form the second raised area 54 in the shape of one or more second curved connection lines (also not shown), such that the one or more first curved connection lines are symmetrically opposite to the one or more second curved connection lines.

Easy to operate, the sole mould described in this Invention is capable of manufacturing quality shoe soles of good air permeability with high efficiency. These shoe soles can perfectly match the feet by automatically adapting themselves to the shape of the feet, and are therefore suitable for wear over a long time. Moreover, the product yield is relatively high.

The shoe sole is particularly comfortable to wear when using a leather midsole. Indeed, because of the relatively high elasticity of leather, the shoe sole may wrap up feet of different shapes. Because parts of the leather midsole are not covered with plastic, it provides with good air permeability and ventilation. The shoe sole is comfortable, cooler and drier compared to other existing shoe soles and solves problems of long-time wearing, poor air permeability, dampness and heating.

The foregoing descriptions of specific examples are intended to illustrate but not to limit this Invention. Any changes and modifications may be made by those skilled in the art and therefore shall fall within the scope of this Invention.

The invention claimed is:

1. A system for forming a shoe sole (10) comprising a fore sole (14) and a rear sole (24), the system comprising:
   a first mold (26) for injection-molding an underside (20) of a midsole (12) to form an injection-molded outsole (17), wherein said first mold (26) is configured in the shape of the fore sole (14); and
   a second mold (28) for injection-molding an upper surface (22) of said midsole (12) to form an injection-molded insole (19), wherein said second mold (28) is configured in the shape of the shoe sole (10);
   wherein said midsole (12) is processed by said first mold (26) and said second mold (28) to fabricate said shoe sole (10) comprising said injection-molded insole (19) and said injection-molded outsole (17);
   wherein said first mold (26) comprises a first female mold (32) and a first male mold (34) each configured in the shape of the fore sole (14);
      wherein said first female mold (32) comprises one or more first downward concave cavities (36) for injection-molding a first area (38) on said underside (20); and
      wherein said first male mold (34) comprises a first injection area (44) comprising one or more of first cylindrical bores (40) and one or more first injection holes (42), wherein each of said one or more first cylindrical bores (40) and said one or more first injection holes (42) are respectively aligned with each of one or more second cylindrical bores (47) and one or more second injection holes (45) for each of said one or more first downward concave cavities (36);
      wherein said first raised area (38) is injection molded to form said injection-molded outsole (17) when said first female mold (32) and said first male mold (34) are assembled; and
   wherein said second mold (28) comprises:
      a second female mold (48) and a second male mold (50), wherein said second female mold (48) and said second male mold (50) match the shape of said first female mold (32) and said first male mold (34);

wherein said second female mold (48) comprises one or more second downward concave cavities (52) configured in the same shape as and at a corresponding position of said one or more first downward concave cavities (36);

wherein said second male mold (50) comprises:

a second injection area (54) comprising one or more second upward concave cavities (55) configured in the same shape as and at said corresponding position as said one or more first downward concave cavities (36) for injection-molding a second raised area (54) on said upper surface (22);

one or more second injection holes (56), each of said one or more second injection holes (56) corresponding to each of said one or more second upward concave cavities (55);

an upwardly-concaved third injection area (56) for forming the rear sole (24) when injected molded; and one or more third injection holes (59) for injection molding said upwardly-concaved third injection area (58);

wherein after said midsole (12) is processed by said first female mold (32) and said first male mold (34), said midsole (12) is further processed by said second female mold (48) and said second male mold (50) to make said midsole (12) an embedded midsole comprising said injection-molded insole (19); and wherein said injection-molded insole (19) and said injection-molded outsole (17) are in communication with each other via said one or more second cylindrical bores (47) to form said embedded midsole (12).

2. The system of claim 1, further comprising a middle plate (60) positioned between said second female mold (48) and said second male mold (50) to produce a curved shoe sole (10) when said midsole (12) is injection molded.

3. The system according to claim 1, wherein each of said one or more first injection holes (42) are in communication with a first injection channel (46) passing through said first male mold (34) and said one or more third injection holes (59) are in communication with one or more third injection channels (61) passing through said second male mold (50).

4. The system according to claim 1, wherein said one or more first downward concave cavities (36) are in communication to form said first raised area (38) in the shape of one or more first curved connection lines, and said one or more second upward concave cavities (55) are in communication to form said second raised area (54) in the shape of one or more second curved connection lines, such that said one or more first curved connection lines are symmetrically opposite to said one or more second curved connection lines.

5. The system according to claim 1, wherein said cylindrical bores (40, 47) and said injection holes (42, 45) comprise a diameter of 2 mm-10 mm.

6. The system according to claim 1, wherein said midsole (12) is a leather layer.

7. The system according to claim 6, wherein said midsole (12) comprises a polyurethane filler (72).

\* \* \* \* \*